United States Patent
Menachem et al.

(10) Patent No.: US 12,332,176 B2
(45) Date of Patent: Jun. 17, 2025

(54) DARK FIELD ILLUMINATION BASED ON LASER ILLUMINATED PHOSPHOR

(71) Applicant: CAMTEK Ltd., Migdal-Haemek (IL)

(72) Inventors: Amnon Menachem, Zefat (IL); Yuval Weissler, Migdal-Haemek (IL); Zehava Ben Ezer, Balfuria (IL)

(73) Assignee: CAMTEK Ltd., Migdal-Haemek (IL)

( * ) Notice: Subject to any disclaimer, the term of this patent is extended or adjusted under 35 U.S.C. 154(b) by 258 days.

(21) Appl. No.: 18/304,260

(22) Filed: Apr. 20, 2023

(65) Prior Publication Data

US 2023/0251198 A1    Aug. 10, 2023

Related U.S. Application Data

(63) Continuation-in-part of application No. PCT/IB2021/059641, filed on Oct. 20, 2021.

(Continued)

(51) Int. Cl.
*G01N 21/64* (2006.01)
*G01N 21/88* (2006.01)
*G01N 21/95* (2006.01)

(52) U.S. Cl.
CPC ....... *G01N 21/645* (2013.01); *G01N 21/8806* (2013.01); *G01N 21/9501* (2013.01); *G01N 2021/6484* (2013.01); *G01N 2021/8816* (2013.01); *G01N 2021/8822* (2013.01); *G01N 2021/8838* (2013.01)

(58) Field of Classification Search
CPC ............. G01N 21/645; G01N 21/8806; G01N 21/9501; G01N 2021/6484; G01N 2021/8816; G01N 2021/8822; G01N 2021/8838
See application file for complete search history.

(56) References Cited

U.S. PATENT DOCUMENTS

2004/0150991 A1\* 8/2004 Ouderkirk .......... H10H 20/8514
362/800
2006/0007531 A1\* 1/2006 Korengut ........... G01N 21/9501
359/362
(Continued)

FOREIGN PATENT DOCUMENTS

EP      2829937 B1    9/2015
KR   101575597 B1   12/2015
(Continued)

OTHER PUBLICATIONS

Youtube, Dolphin Premier Review, Rick Escalante https://www.youtube.com/watch?v=rOZMebaXztA7/20/2013 (Year: 2013).

*Primary Examiner* — David P Porta
*Assistant Examiner* — Fani Polyzos Boosalis
(74) *Attorney, Agent, or Firm* — Whitestone Law, PLLC

(57) ABSTRACT

An illumination module may include a laser diode array configured to emit laser radiation; a phosphor illumination unit that is configured to emit phosphor radiation following an exposure to the laser radiation; a multiple-angle illumination unit; and intermediate optics that is configured to convey the phosphor radiation to the multiple-angle illumination unit. The multiple-angle illumination unit is configured to receive the phosphor radiation and to dark field illuminate a region of a sample wafer from multiple angles during inspection of the wafer.

20 Claims, 12 Drawing Sheets

Related U.S. Application Data

(60) Provisional application No. 63/094,089, filed on Oct. 20, 2020.

(56) References Cited

U.S. PATENT DOCUMENTS

| | | |
|---|---|---|
| 2007/0067930 A1 | 3/2007 | Garti |
| 2013/0010492 A1* | 1/2013 | Montgomery .......... F21S 41/16 |
| | | 362/553 |
| 2015/0101135 A1 | 4/2015 | Witelson et al. |
| 2017/0342733 A1 | 11/2017 | Korenfeld et al. |
| 2018/0224856 A1 | 8/2018 | Durvasula et al. |
| 2020/0134773 A1* | 4/2020 | Pinter ................. G01N 21/8806 |

FOREIGN PATENT DOCUMENTS

| | | | |
|---|---|---|---|
| TW | 201438936 A * | 3/2013 | .............. F21S 41/16 |
| WO | 2013060984 | 6/2013 | |

* cited by examiner

DARK FIELD ILLUMINATION BASED ON LASER ILLUMINATED PHOSPHOR

BACKGROUND

Traditional DF (dark field) or bright field white light illumination systems for wafer inspection and defect detection make use of a flash light bulb (Xenon or other) source, which suffers from a limited light energy, a light energy instability and a fast emitted light flux degradation with time. Other traditional DF light sources such as non-coherent solid state LED (Light Emitting Diode) light sources are characterized by an inherent broad angular emission and\or large emission area along with limited radiance while coherent solid state laser light sources are characterized by a narrow wavelength emission bandwidth (BW), which may reduce the number of applications to explore with such light source and the potential speckles creation at the plane of interaction with targeted wafer illuminated objects, the last of which applying a severe limitation to object defects detection by the imaging channel.

BRIEF DESCRIPTION OF THE INVENTION

The present invention will be understood and appreciated more fully from the following detailed description taken in conjunction with the drawings in which.

DETAILED DESCRIPTION OF THE INVENTION

Figure 1:
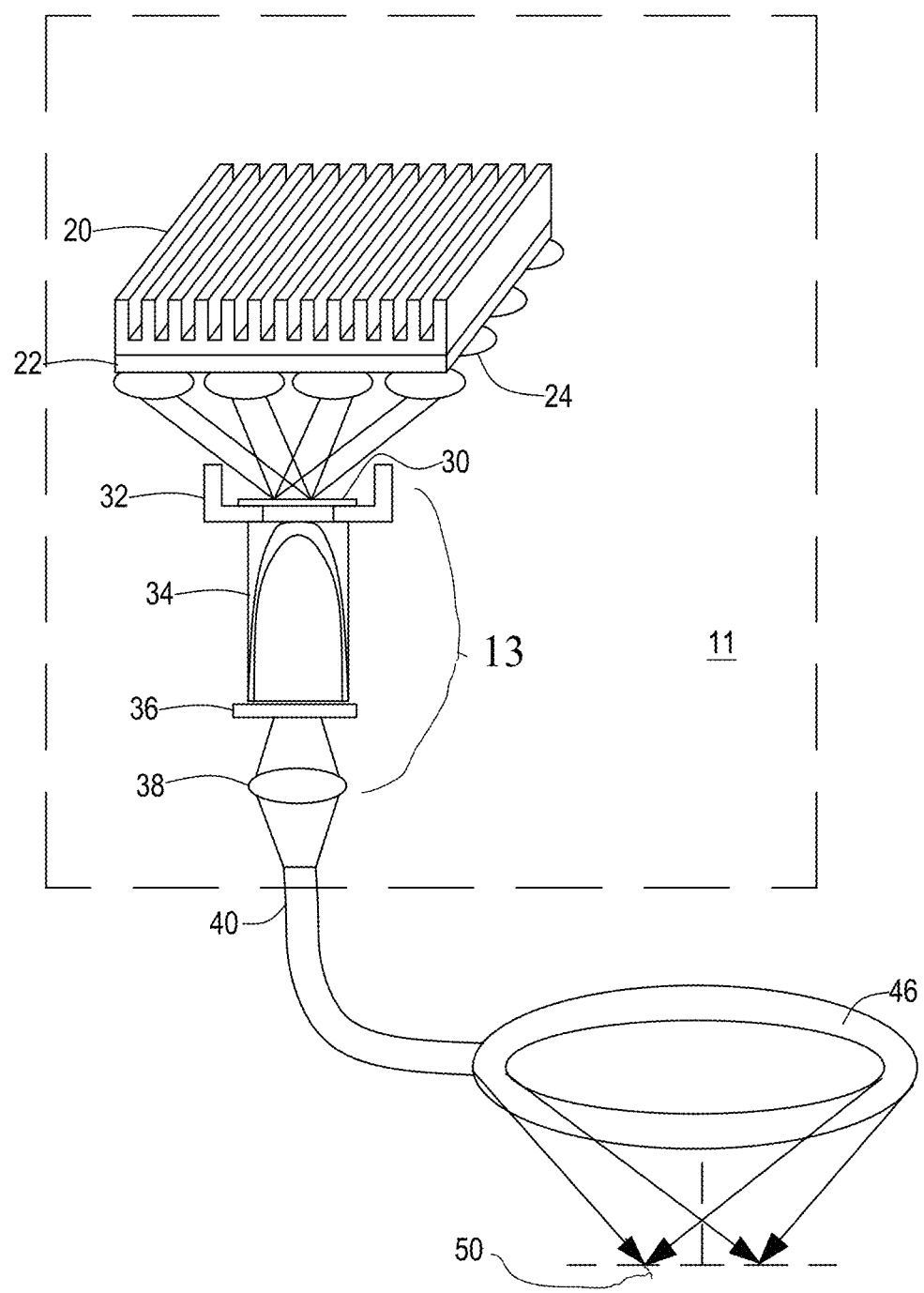
FIG. 1 illustrates an example of an illumination module.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer program product that stores instructions that once executed by a computer result in the execution of the method. The non-transitory computer program product may be a chip, a memory unit, a disk, a compact disk, a non-volatile memory, a volatile memory, a magnetic memory, a memristor, an optical storage unit, and the like.

Any reference in the specification to a system should be applied mutatis mutandis to a method that can be executed by the system and should be applied mutatis mutandis to a non-transitory computer program product that stores instructions that once executed by a computer result in the execution of the method.

Any reference in the specification to a non-transitory computer program product should be applied mutatis mutandis to a method that can be executed when applying the instructions stored in the non-transitory computer program product and should be applied mutatis mutandis to a system capable of executing the instructions stored in the non-transitory computer program product.

The term "comprising" is synonymous with (means the same thing as) "including," "containing" or "having" and is inclusive or open-ended and does not exclude additional, unrecited elements or method steps.

The term "consisting" is a closed (only includes exactly what is stated) and excludes any additional, unrecited elements or method steps.

The term "consisting essentially of" limits the scope to specified materials or steps and those that do not materially affect the basic and novel characteristics.

In the claims and specification any reference to the term "comprising" (or "including" or "containing") should be applied mutatis mutandis to the term "consisting" and should be applied mutatis mutandis to the phrase "consisting essentially of".

In the claims and specification any reference to the term "consisting" should be applied mutatis mutandis to the term "comprising" and should be applied mutatis mutandis to the phrase "consisting essentially of".

In the claims and specification any reference to the phrase "consisting essentially of" should be applied mutatis mutandis to the term "comprising" and should be applied mutatis mutandis to the term "consisting".

The term "multiple-angle illumination unit" refers to an illumination unit that illuminates a sample from multiple azimuthal angles. The multiple-angle illumination unit may illuminate a region of a sample—whereas many pixels of the region are illuminated from the same multiple azimuthal angles. The following examples illustrate multiple-angle illumination units that are fiber rings. The multiple-angle illumination units may differ from fiber rings by shape. The polar angle (which may be referred to, for simplicity of explanation as an illumination angle) of different rays may be the same or may differ from one or more rays to other one or more rays. The multiple azimuthal angles may spread over one or more continuous azimuthal angular ranges and/or one or more non-continuous azimuthal angular ranges.

In the following specification, the invention will be described with reference to specific examples of embodiments of the invention. It will, however, be evident that various modifications and changes may be made therein without departing from the broader spirit and scope of the invention as set forth in the appended claims.

It has been found that etendue and radiance limited light sources may apply a severe limit to wafer inspection and defect detection from the following major reasons:

a. Relatively large volume space required to host the illumination system, which is dictated by light source dimensions and cooling requirements. This is a major limitation with respect to direct illumination LED light sources (where source is illuminating the FOV directly). With ever demanding of various types of inspection devices for different probing purposes, being in the immediate vicinity of inspected wafer and using a small working distance of high magnification objective lenses for small defects detection, a large volume DF device is a real drawback b. Limited light to FOV by virtue of limited radiance as of low optical power per unit area and per unit steradian. This drawback is further enhanced by the desire to include a versatile and broad range of DF illumination angles in a microscopic system.

It been found that as wafer details that require inspection increase and their dimensions becoming smaller, there is a need to improve DF systems as follows:

a. Higher magnifications and higher resolution microscopic systems, which require more complicated low to high NA optics. Thus the microscope volume increases and most often with working distance decreases, which may apply a severe limitation as for the available space to host the DF illumination system.

b. Higher light irradiance at the FOV as a result of smaller object pixel size is required for a good detection.

c. Broader illumination angular range coverage potential from imaging objective NA up to very shallow illumination angles of nearly 90 deg with respect to the normal to FOV, as of the demand for a larger illumination angular coverage. This is required as of the fact that a broader spectrum of defects and smaller size defects are required to be detected. Defects may be revealed by illuminating using a certain illumination angle and\or having a certain illumination angular span (angular coverage at certain illumination angle) but may not be revealed by other illumination angle and\or illumination angular span. These defects may be better revealed by having a larger and diverse options to control the light illuminating the FOV.

d. As far as multiple polar angles of illumination covering the entire DF illumination angular space from low acute illumination angle to high shallow illumination angle with respect to imaging microscope optical axis while each illumination angle has a narrow angular coverage consisting high emitted radiance and such that the entire available DF illumination angular space is fully realized.

Low throughput and low scan rate has always been a drawback and the desire to constantly increase these factors should be considered. However increasing throughput could not be achieved with limited radiance and limited pulse response time (rise and fall time) light sources.

There may be provided a system, an illumination module of the system, and a method for operating the illumination module, that uses a phosphor illuminated by a laser diode to create a dark field (or bright field) illumination module for wafer inspection and defect detection.

At least one laser diode array may be combined to illuminate the same spot at desired spot size over a phosphor material with desired characteristics, and additional optics may efficiently gather the light into an optical fiber (or other radiation distributer) with the desired optical characteristics to illuminate wide FOV at one or more desired illumination angle, desired white spectral range along with good angular and field uniformity.

Unlike non-laser illumination sources having a relatively large area emitter and wide angular emission, which put a severe limit as to the amount of light that could be manipulated to illuminate the FOV, the laser has much higher brightness and spatial coherency, which enables the delivery of larger amount of light into the FOV with significant less light loss comparing to flash and LED based systems. Moreover, the laser light sources may be hosted at a remote space away from FOV and deliver the light to FOV using small radiation distributers (such as thin optical fibers). Thus, volume space limitation is reduced comparing to direct FOV illumination light sources The meaningful progress (of the last years) made in producing much more light efficiency of phosphor materials enables extracting much more light from a phosphor material of the illumination module.

The advantages over other DF illumination systems:

a. The extracted radiation (for example white light or other radiation) flux may be limited only by the available amount of laser diodes, laser diode optical power, available volume space and phosphor material characteristics and phosphor saturation limit.

b. The spot size may be very small and limited only by laser spot, optics means and optics quality, phosphor spot and phosphor damage\irradiance threshold.

c. The illumination module may use small radiation distributers (such as thin fiber rings) and thus requires small volume space, which enables using multiple radiation distributers (for example several fiber rings) to illuminate at different illumination angles.

d. The concept enables illumination at different wavelength (WL) bands using different laser excitation and phosphor materials and at different (2 or more) illumination angles and in very short time delay (for example between 0.1 and 10 microns) between different subsystems to capture different DF images within the same scanned frame.

FIG. 1 illustrates an illumination module 10 with a single laser diode array 22 and a single fiber ring 46.

The single laser diode array 22 is preceded by heat sink 20 and followed by laser diode optics 24.

Light from the laser diode array 22 is directed by the laser diode optics to form a spot on phosphor material 30 that is thermally coupled to phosphor cooling unit 32 that has an aperture for allowing phosphor radiation emitted from the phosphor material 30 to be collected by phosphor optics 34 to pass through filter (notch or high pass filter) 36 onto adaptive optics 38 that directs the phosphor radiation to optical fiber 40 that is optically coupled to the fiber ring 46 that illuminates a substrate with an illuminated FOV 50.

The illumination NA at the fiber input is fixed for a certain laser diode array by virtue of a lens 38 stop size and its distance from the fiber input (half stop size divided by distance) and its' limit depends on the adaptive optics characteristics (for example—the NA is about ½F # in the paraxial approximation). The illumination NA may be changed by amending the phosphor optics characteristics. If, for example, the output from the phosphor optics is semi-collimated then applying a convex lens 38 while fiber input is at the focal point we get a focused spot and NA determined by the convex lens. Changing the aperture of the convex lens (for example by an adaptable shutter) changes the NA while the focal point remains the same. Yet for another example—the NA may be changed by changing the distance between the convex lens and the fiber optics and by changing optical fiber characteristics. The adaptive optics may also transform light from diverge light into a converging light at the fiber input.

The illumination module 10 is illustrated as including a laser to phosphor radiation unit 11 that is followed by the optical fiber 40. The laser to phosphor radiation unit 11 includes the laser diode array 22, heat sink 20, laser diode optics 24, phosphor material 30, phosphor cooling unit 32, phosphor optics 34, filter 36 and adaptive optics 38.

The phosphor material 30, phosphor cooling unit 32, phosphor optics 34, filter 36 and adaptive optics 38 form a phosphor illumination unit 13.

Figure 2:
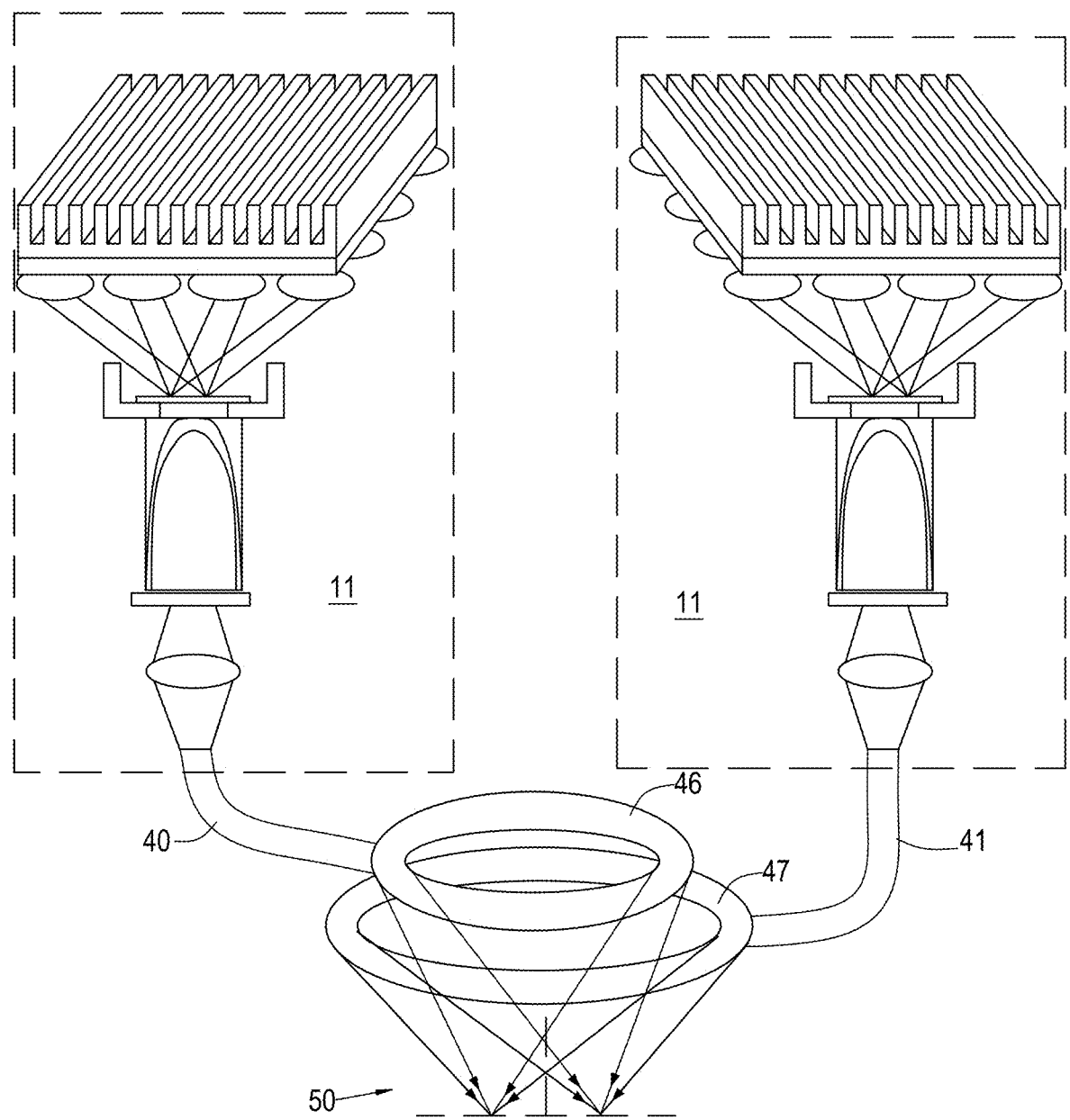
FIG. 2 illustrates an example of an illumination module.

FIG. 2 illustrates an illumination module 10' that includes phosphor radiation units 11 optically coupled by optical fibers 40 and 41 (which are examples of intermediate optics—each optically couple the phosphor radiation unit 11 to the fiber rings) to fiber rings 46 and 47 for providing two different illumination angles and for illuminating a substrate with an illuminated FOV 50.

There may be more than two laser diode arrays and there may be more than two fiber rings. The fiber rings may differ from each other by distance from the substrate, radius, and ratio between radius and distances from substrate (the ratio determine the angle of illumination).

Figure 3:
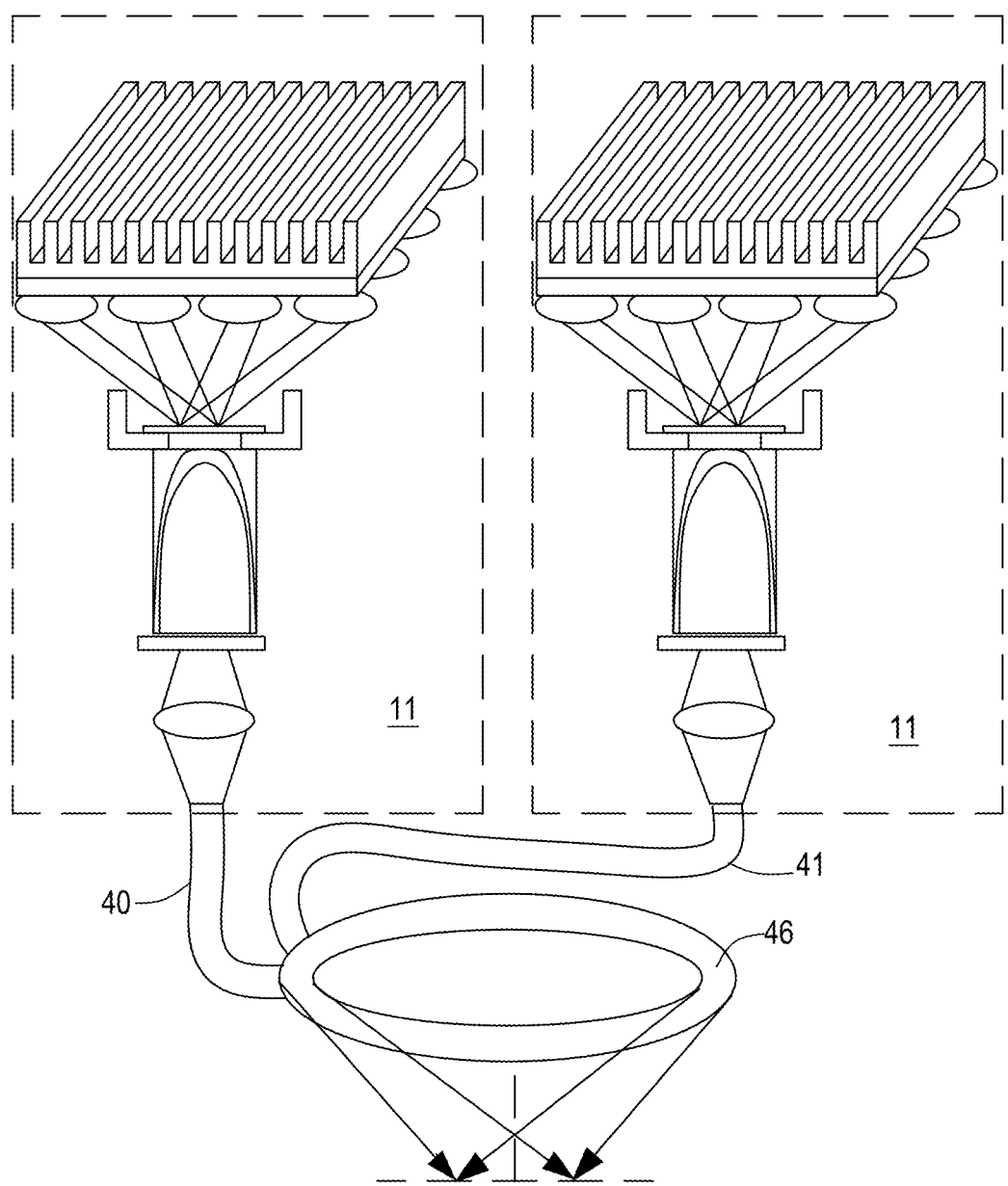
FIG. 3 illustrates an example of an illumination module.

FIG. 3 illustrates an illumination module 10" that includes different laser diode arrays 22 of different wavelengths of different laser to phosphor radiation units 11 that are optically coupled by optical fibers 40 and 41 to a single fiber ring 46 that illuminates a substrate with an illuminated FOV 50. Any number and/or combinations of laser diode arrays, and/or radiation distributers (for example fiber rings) may be provided.

A first laser to phosphor radiation unit may include a laser diode array, intermediate optics, a phosphor illumination unit, and other components. The first laser to phosphor radiation unit may be configured to emit phosphor radiation.

A second laser phosphor radiation unit may include an additional laser diode array, additional intermediate optics an additional phosphor illumination unit and other additional components. The second laser to phosphor radiation unit may be configured to emit additional phosphor radiation.

In FIG. 2 the phosphor radiation is provided to a first fiber ring while the additional phosphor radiation is provided to a second fiber ring. In FIG. 3 the phosphor radiation and the additional phosphor radiation are provided to the same first fiber ring.

Figure 4:
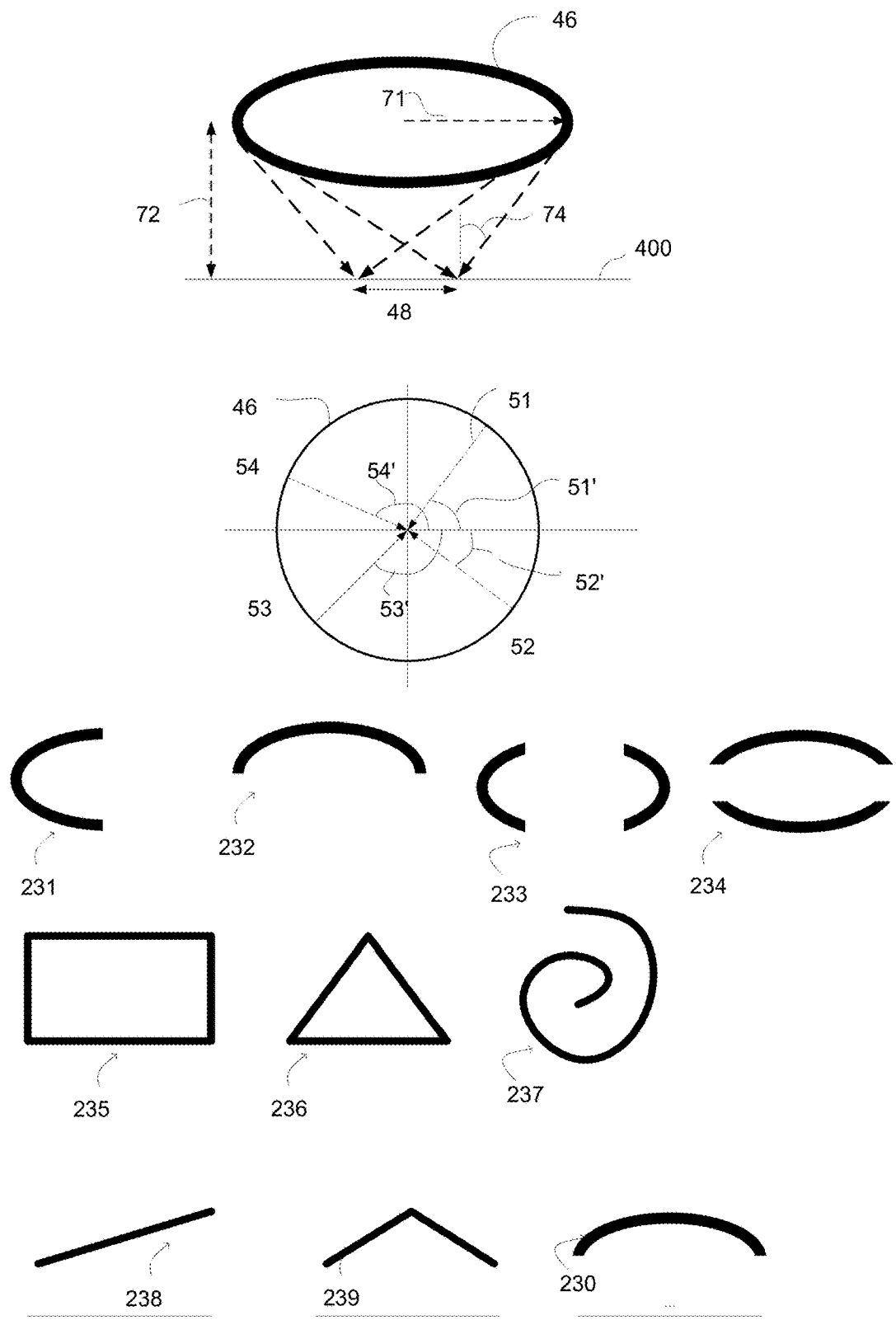
FIG. 4 illustrates an example of various multiple-angle illumination units and of various polar and azimuthal angles of phosphor radiation rays.

FIG. 4 includes a top view and a side view of a fiber ring 46 that illuminates a substrate 400 with a spot of diameter 48. The fiber ring has a radius 71 and is located at a distance 72 from the substrate. The ratio between the radius and the distance determines the illumination angle (polar angle) 74. The different rays may also differ from each other by their azimuthal angles—as can be seen by the different azimuthal angles 51', 52', 53' and 54' of rays 51, 52, 53 and 54 respectively. Rays 51-54 may be only a fraction of the rays emitted by the fiber ring.

FIG. 4 also illustrates different multiple-angle illumination units 231, 232, 233 and 234 that may be arc-shaped. Multiple-angle illumination units 233 and 234 include two arc-shaped elements each. There may be more than two arc-shaped elements per multiple-angle illumination unit. A multiple-angle illumination unit may have any shape—may include one or more non-linear segments and/or one or more liner segments. For example—the multiple-angle illumination unit may be a polygon (for example a rectangle (235), a triangle (234)) or a spiral 237. The multiple-angle illumination unit may be parallel to a surface of the sample, may include different parts that are located at different distances from the sample—for example the multiple-angle illumination unit may be oriented to the surface of the sample (238), may have a curved cross section (239), may have an ascending part and a descending part (see 239).

Figure 5:
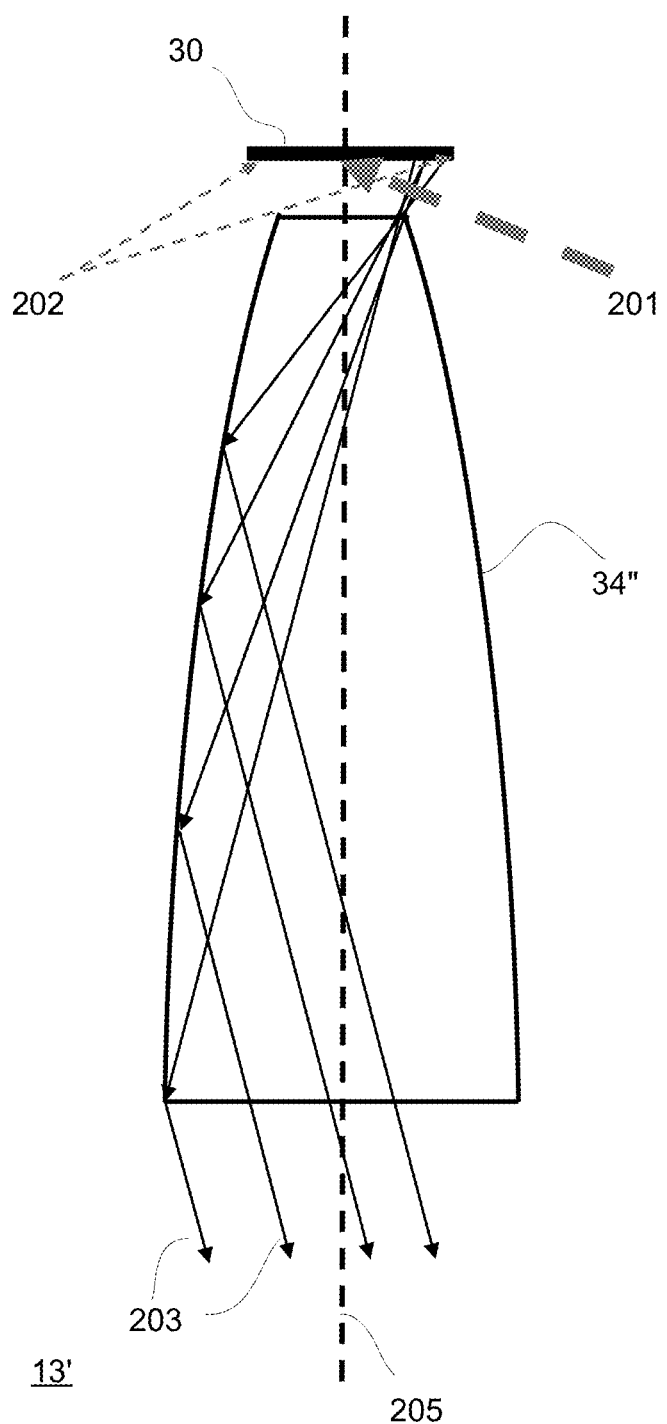
FIG. 5 illustrates an example of a phosphor illumination unit.

FIG. 5 illustrates a phosphor illumination unit 13' that includes phosphor material 30 that is illuminated by collimated laser radiation 201 and/or non-collimated laser radiation 202, causing the phosphor material 30 to scatter phosphor radiation onto CPC (compound parabolic concentrator) 34. The facet of the phosphor material that is illuminated is the same facet that faces the CPC and this mode of illumination may be referred as a reflection mode or back scattered mode. The laser radiation 201 or 202 may be a laser diode array arranged in a ring fashion or a dome fashion or any other fashion surrounding axis 205 (revolving FIG. 6 in 3D dimension) such that multiple LD arrays illuminating phosphor material 30 at different illumination angles with respect to axis 205

The CPC (having optical axis 205) collects the phosphor radiation and may output phosphor radiation 203 that may include phosphor radiation 203 resulting from the illumination with the collimated laser radiation 201 and/or the non-collimated laser radiation 202.

The collimated laser radiation 201 may impinge on the phosphor material from any angle (even from the directions in which FIG. 5 illustrates the non-collimated laser radiation)—and vise verse).

Figure 6:
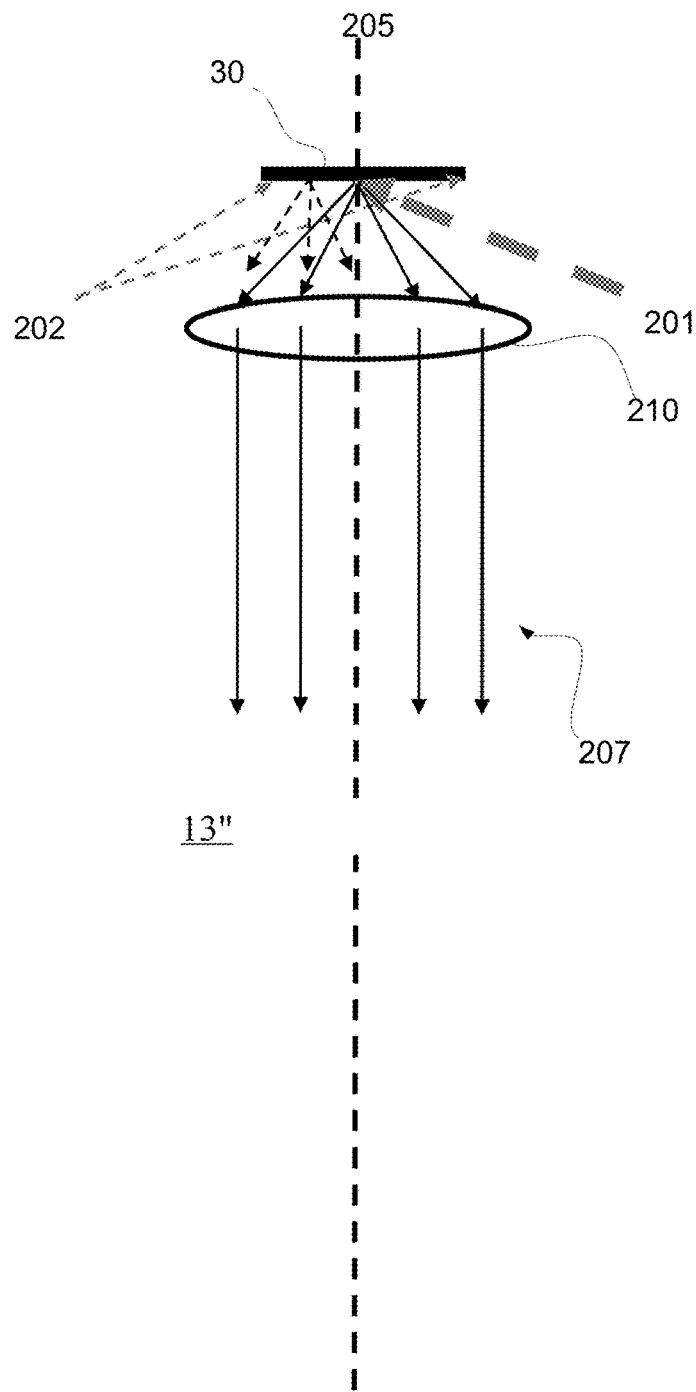
FIG. 6 illustrates an example of a phosphor illumination unit.

FIG. 6 illustrates a phosphor illumination unit 13" that include phosphor material 30 that is illuminated by collimated laser radiation 201 and/or non-collimated laser radiation 202 causing the phosphor material 30 to scatter phosphor radiation onto lens 210. The facet of the phosphor material that is illuminated is the same facet that faces the lens 210—and this mode of illumination may be referred as a reflection mode or back scattered mode.

The lens collects and collimates the phosphor radiation provided by collimated laser radiation 201 to provide semi-collimated phosphor radiation 207. In another example, the lens collects the phosphor radiation provided by non-collimated laser radiation 202 to provide non-collimated phosphor radiation (not shown).

The lens design may vary, for example, a convex lens, a plano-convex lens, a bi-convex lens, a spherical lens, or aspherical lens or Fresnel lens or a combination of lenses or alike.

Figure 7:
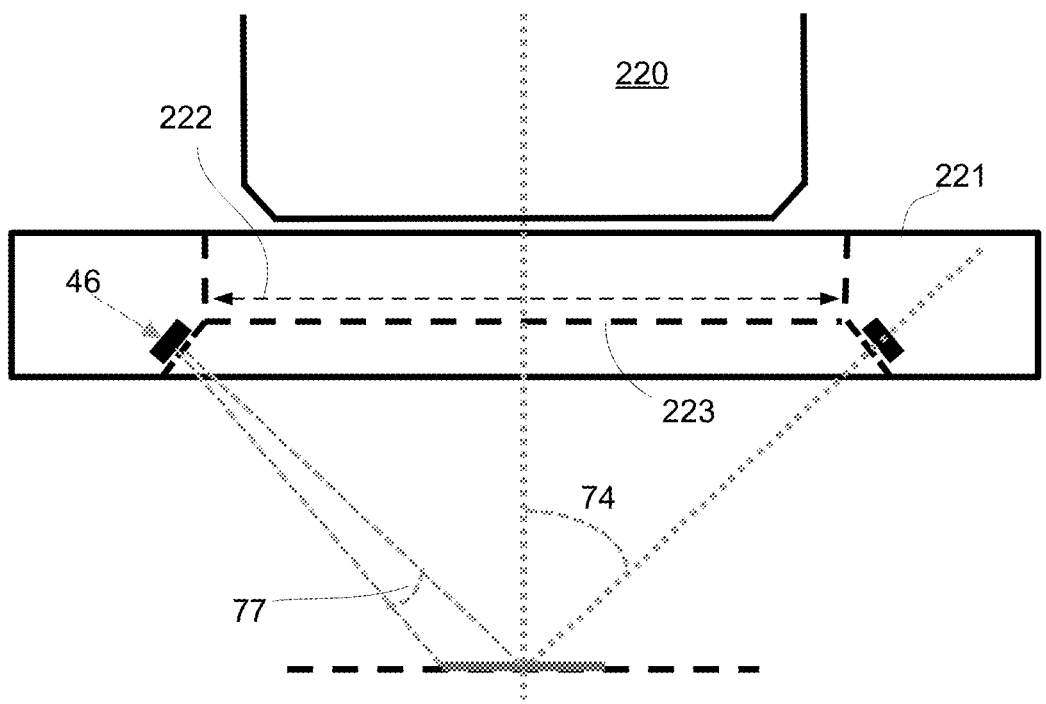
FIG. 7 illustrates an example of an objective lens and a multi-phosphor illumination unit.
Figure 8:
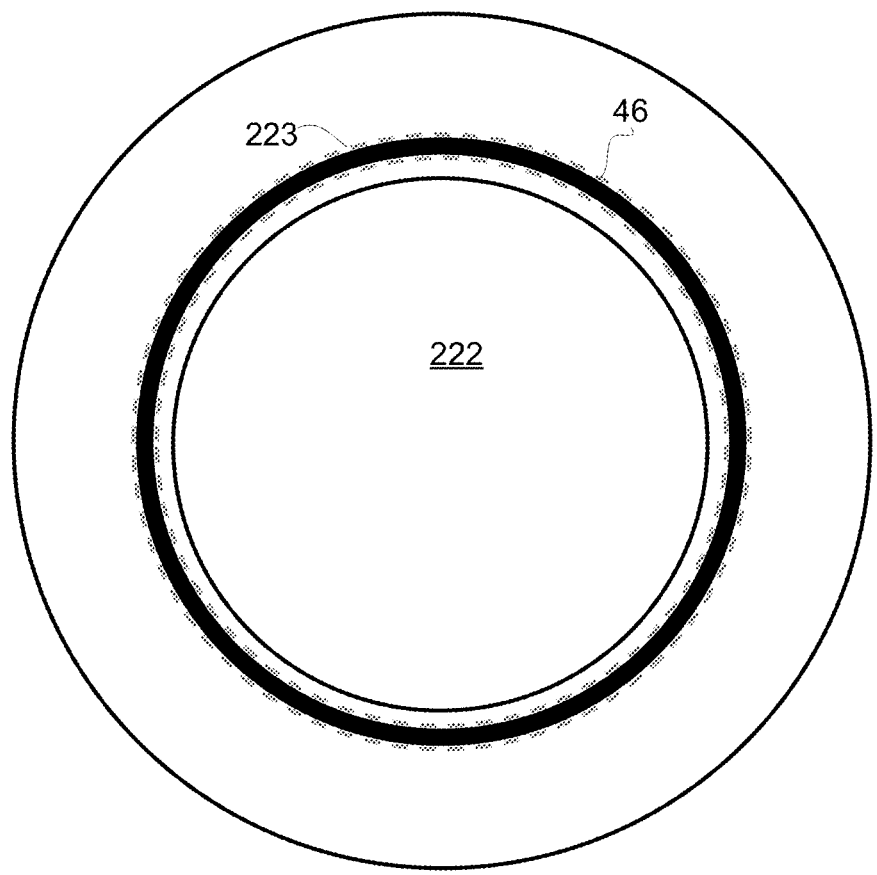
FIG. 8 illustrates an example of a part of the illumination module.

FIG. 7 is a cross sectional view of a part of the illumination module. FIG. 8 is a bottom view of the part of the illumination module. The part of the illumination module includes a conical fiber ring 46, a housing 221 having an opening 222 to enable the objective lens gathering the light from FOV 50 and an annular optical element 223 that has a tilted facet that faces the fiber ring 46. FIG. 7 also illustrates an objective lens 220, an illumination NA 77 and illumination angle 74.

Figure 9:
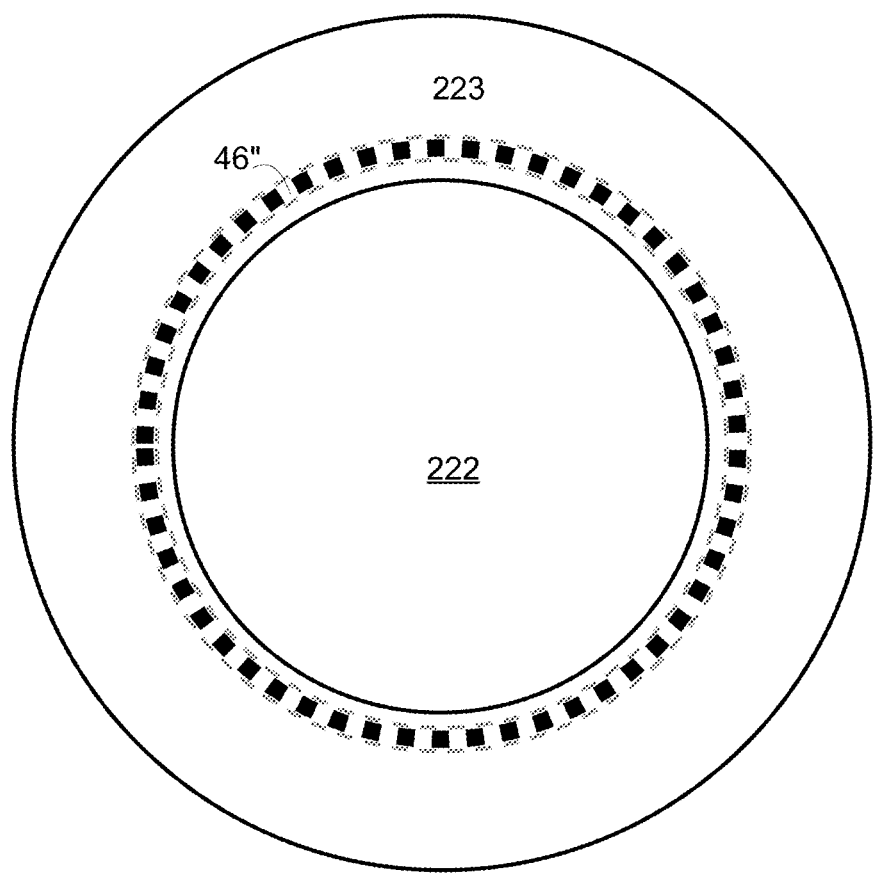
FIG. 9 illustrates an example of a part of the illumination module.

FIG. 9 is a bottom view of the part of the illumination module. While in FIG. 8 the fiber ring is continuous and may emit phosphor radiation from any azimuthal angle—the fiber ring 46" of FIG. 9 is a spotted ring that include spaced apart illumination elements for outputting rays from spaced apart azimuthal angular sub-ranges.

Figure 10:
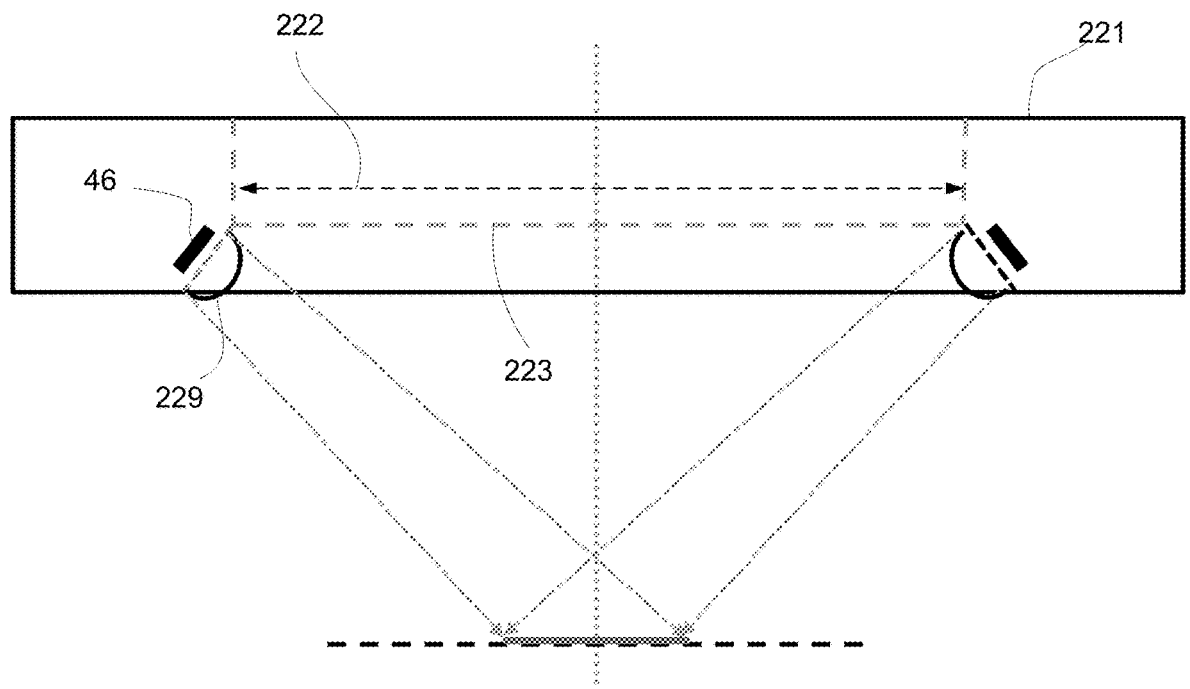
FIG. 10 illustrates an example of a part of the illumination module.

FIG. 10 is a cross sectional view of a part of the illumination module. The part of the illumination module includes a fiber ring 46, a housing 221 having an opening 222, an annular optical element 223 that has a tilted facet that faces the fiber ring 46, and micro-lenses 229. The fiber ring is a conical fiber ring. A virtual normal to the tilted facet points towards the center of FOV or towards another point at FOV plane. The tilted facet is followed by the microlenses 229. The microlenses are configured to receive the phosphor radiation from the fiber ring 46 and to illuminate the substrate over the FOV plane.

All illumination schemes may include either transmission mode or back-reflected scattering mode or both in one or more combined illumination modules.

A laser diode array may be arranged in any desired form-2D array over PC board, a ring, 3D hemispherical dome, etc.

A laser diode of the array may be operated at continuous or pulse\strobe mode. Any segment of an array (of any form) and/or any number of laser diode may be operated using a separated driver (for selected array segment\s).

The illumination distribution of the FOV at a certain interval time (which is the result of a certain laser diode arrays aggregation illuminating at a certain direction and illumination angles) may be varied in the angular hemispherical space over time.

Illumination of different laser diode array\laser diode segments may have a desired strobing delay time providing FOV illumination at different illumination angles under the same scanning time frame. For example—a first laser diode array LDA1 is triggered at T0 for 2 microSec pulse duration, then a second laser diode array LDA2 is triggered at "T0+2 microSec". After response time of say 0.1 microSec, LDA2 emits light for a pulse duration of 2 microSec, LDA2 ceases emitting light after T0+4.1 microSec, etc. LDA1 and LDA 2 emit light during camera shutter opening interval time (depending on scan rate and grabbing interval time and sequence). In other option both LDA1 and LDA2 are triggered at T0. In this case sampled application will experience light coming from different illumination angles and angular span or multiple illumination angles or different wavelength spectrum (as per the different illumination schemes) at the same time.

Several laser diode arrays over the same board or different boards may be of different type of wavelength that may illuminate different types of phosphors at the same time or phase shifted by required delay time.

The light from each cooled laser diode is manipulated by the optics array (mold array or other) to create a circular (or semicircular) collimated or semi collimated or a focused beam at the phosphor.

The common spot size created by an ensemble of laser diode array may vary depending on desired application and to the limit of phosphor (in use) irradiance damage threshold. Radiation (for example narrow band within the visible light spectrum) emitted from the phosphor may be collected by optics such as but not limited to a wide collector Compound Parabolic Collector (CPC) of any kind (hollow, solid, TIR, combined with secondary lens, etc) according to desired NA, or, for example by a high or low NA collecting lens or any other mirror optics to efficiently collect the light from the phosphor material and efficiently manipulate it to illuminate the targeted FOV.

A notch filter (or high pass filter) may perform speckle reduction by filtering the laser radiation so that the illuminated FOV will not show a speckle effect as a result of laser coherency or laser interaction with phosphor material.

Additional optics, such as an adaptive secondary optics may couple the light into desired optical fiber. A typical NA may range between 0.01 to 0.6. The light emitted from a fiber ring may illuminate a desired FOV size at desired illumination angle depending on optical design scheme. Several such fiber rings may be of any form, size and cut into any shape, such as conical polished ring in which the output face of the fiber ring is oriented to the horizon or other to illuminate FOV at different angles. Fiber ring may include additional micro-optics such as microlenses as desired to efficiently control the targeted illuminated FOV size.

A fiber ring may be arranged below the objective lens or in the peripheral volume space surrounding the objective lens, outside the light cone created by virtue of objective lens characteristics with respect to FOV.

According to another example—a laser diode array (ring or other shape) may illuminate a phosphor. The back reflected\scattered or diffused light from the phosphor is gathered by phosphor optics (for example—such as the optics illustrated above and/or in either one of FIGS. 1 and 2—or optics that differs from a CPC) and according to some physical limitations and undergo a similar path.

Regarding the phosphor optics—it may include a CPC or may not include a CPC. For example—a standard lens may be found more efficient depending on phosphor characteristics. As the phosphor distance from CPC increases light throughput will be smaller. The CPC advantage is its broad angular light gathering from the phosphor material. So the phosphor optics in use may be regarded to phosphor material emission characteristics and desired light coupled to fiber 40 or 41 input.

Figure 11:
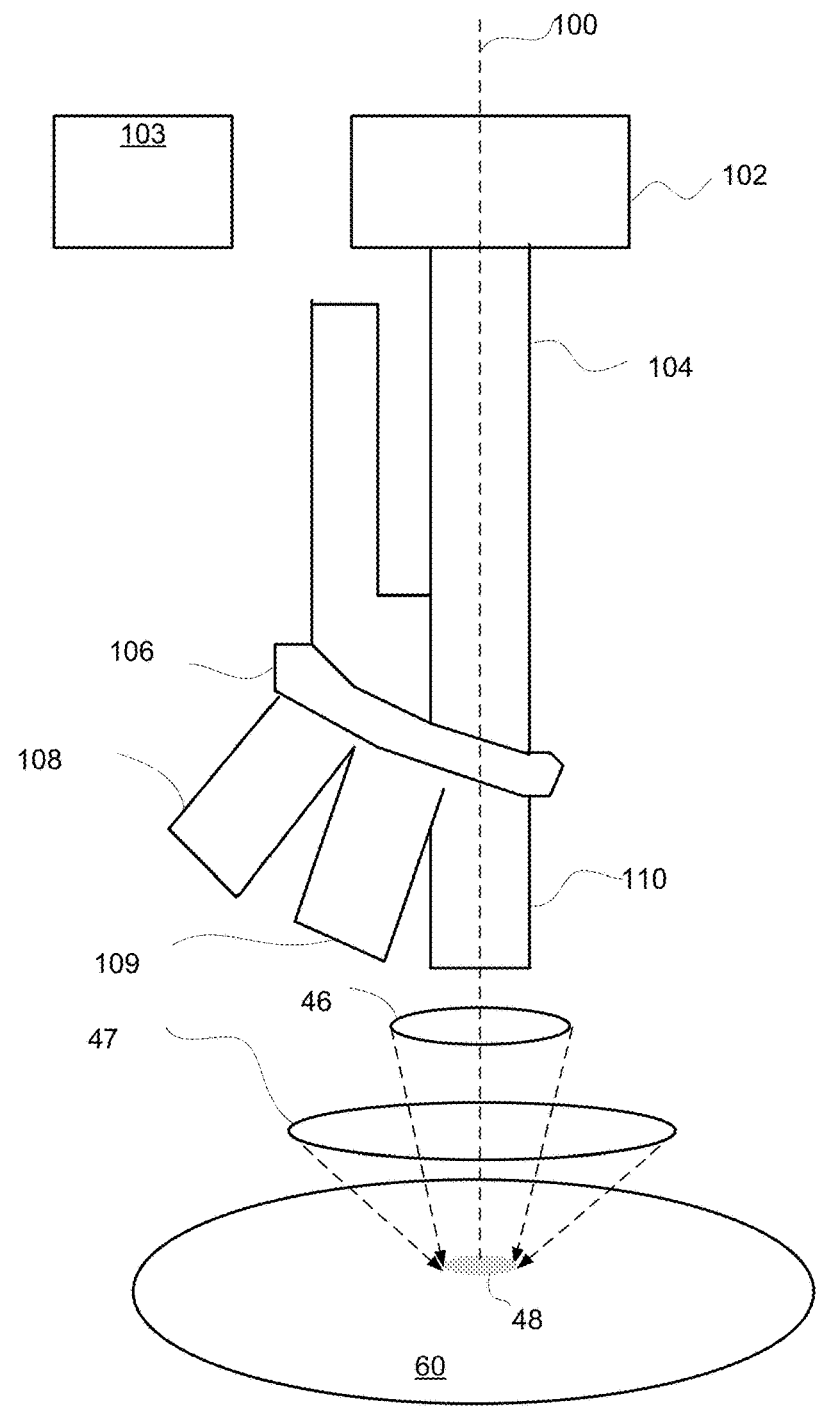
FIG. 11 illustrates an example of a microscope with an illumination module.

FIG. 11 is an example of an optical microscope 104 and a camera 102 that have an optical axis 100, turret 106, objective lenses 108, 109 and 110, and fiber rings 46 and 47 for providing different illumination angles and for illuminating a substrate 60 with an illuminated FOV 48.

Fiber rings 46 and 47 are fed by laser to phosphor radiation units and optical fibers that are not shown for simplicity of explanation. The laser to phosphor radiation units may be spaced apart (for example at a distance of at least 20, 30, 40, 50, 60, 70, 80, 100, 150 centimeters and the like) from the fiber rings.

FIG. 11 also illustrates a controller 103 for controlling the optical microscope and any of the laser to phosphor radiation units. A controller may control any of the illumination units illustrated in FIGS. 1-10. The controller may control the timing and sequence of generation of illumination, the illumination intensity, and the like.

Figure 12:
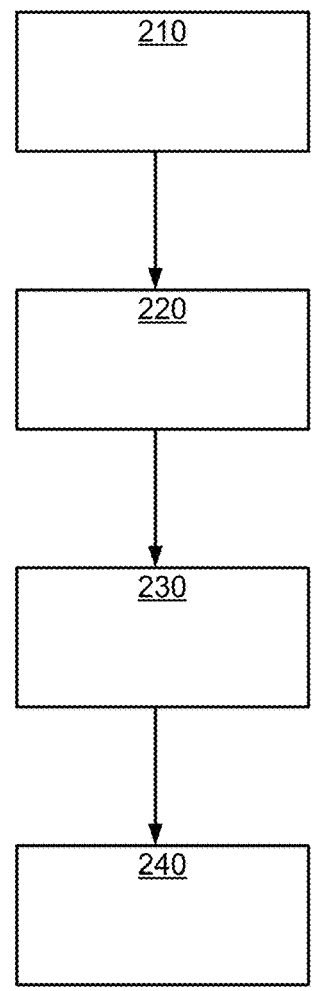
FIG. 12 illustrates an example of a method.

FIG. 12 illustrates an example of a method 200 for illuminating a sample with phosphor radiation.

Method 200 may start by step 210 of emitting laser radiation by a laser diode array.

Step 210 may be followed by step 220 of emitting phosphor radiation by a phosphor illumination unit, following (and in response to) the exposure to the laser radiation.

Step 220 may be followed by step 230 conveying, by intermediate optics, the phosphor radiation to a multiple-angle illumination unit.

Step 230 may be followed by step 240 of illuminating a region of the sample from multiple angles with the phosphor radiation.

Method 200 may be executed by any of the mentioned above illumination modules.

There may be multiple laser arrays and/or one or more intermediate optics and/or one or more multiple-angle illumination unit—see for example—FIGS. 2-3.

Step 210 may be executed by multiple laser diode arrays (concurrently, in a partially overlapping manner or in a non-overlapping manner—in the timing domain—for example non-overlapping means that one laser diode array are operated one at a time, concurrently means that the multiple laser diodes output radiation at the same time).

Step 220 may be executed by multiple phosphor illumination units (concurrently, in a partially overlapping manner or in a non-overlapping manner).

Step 230 may be executed by multiple intermediate optics (concurrently, in a partially overlapping manner or in a non-overlapping manner)—that may be optically coupled to one or more multiple-angle illumination unit.

Step 240 may be executed by the one or more multiple-angle illumination units. Where there are two or more multiple-angle illumination units than the illumination may be executed concurrently, in a partially overlapping manner or in a non-overlapping manner.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

However, other modifications, variations, and alternatives are also possible. The specifications and drawings are, accordingly, to be regarded in an illustrative rather than in a restrictive sense.

The word "comprising" does not exclude the presence of other elements or steps then those listed in a claim. It is understood that the terms so used are interchangeable under appropriate circumstances such that the embodiments of the invention described herein are, for example, capable of operation in other orientations than those illustrated or otherwise described herein.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe.

Thus, these terms are not necessarily intended to indicate temporal or other prioritization of such elements. The mere fact that certain measures are recited in mutually different claims does not indicate that a combination of these measures cannot be used to advantage.

We claim:

1. An illumination module, comprising:
   a laser diode array configured to emit laser radiation;
   a phosphor illumination unit that is configured to emit phosphor radiation following an exposure to the laser radiation;
   a multiple-angle illumination unit;
   and intermediate optics that is configured to convey the phosphor radiation to the multiple-angle illumination unit; and
   wherein the multiple-angle illumination unit is configured to receive the phosphor radiation and to dark field illuminate a region of a sample wafer from multiple angles during inspection of the wafer.

2. The illumination module according to claim 1 wherein the multiple-angle illumination unit is an illumination ring.

3. The illumination module according to claim 1 wherein the multiple-angle illumination unit is a ring-shaped optical fiber.

4. The illumination module according to claim 1 wherein the multiple-angle illumination unit is an arc-shaped illumination unit.

5. The illumination module according to claim 1 wherein a distance between the multiple angle illumination and the laser diode array exceeds 50 centimeters.

6. The illumination module according to claim 1 wherein the intermediate optics comprises a Compound Parabolic Collector.

7. The illumination module according to claim 1 comprising an additional laser diode array, an additional phosphor illumination unit, and an additional intermediate optics; wherein the additional laser diode array configured to emit additional laser radiation; the additional phosphor illumination unit is configured to emit additional phosphor radiation following an exposure to the additional laser radiation.

8. The illumination module according to claim 7 comprising an additional intermediate optics that is configured to convey the additional phosphor radiation to the multiple-angle illumination unit; wherein the multiple-angle illumination unit is configured to receive the additional phosphor radiation and to illuminate the region of the sample wafer with the additional phosphor radiation from multiple angles.

9. The illumination module according to claim 8 wherein the additional laser diode array and the laser diode array are configured to emit radiation in a non-overlapping manner.

10. The illumination module according to claim 8 wherein the additional laser diode array and the laser diode array are configured to emit radiation in an-overlapping manner.

11. The illumination module according to claim 7 comprising an additional multiple-angle illumination unit and an additional intermediate optics that is configured to convey the additional phosphor radiation to the additional multiple-angle illumination unit; wherein the additional multiple-angle illumination unit is configured to receive the additional phosphor radiation and to illuminate the region of the sample wafer with the additional phosphor radiation from multiple angles.

12. The illumination module according to claim 11 wherein the additional multiple-angle illumination unit and the multiple-angle illumination unit are positioned at different distances from the sample wafer.

13. The illumination module according to claim 11 wherein the additional multiple-angle illumination unit and the multiple-angle illumination unit differ from each other by ratio between radius and distance from the sample wafer.

14. The illumination module according to claim 7 wherein a spectral signature of the phosphor radiation differs from a spectral signature of the additional phosphor radiation.

15. The illumination module according to claim 1, that exhibits a numerical aperture having values within a range of 0.01-0.6.

16. The illumination module according to claim 1, wherein the multiple-angle illumination unit is configured to dark field illuminate the region of the wafer from the multiple angles that exhibit an angular uniformity and field uniformity.

17. A method for dark field illuminating a sample wafer with phosphor radiation, the method comprises:
emitting laser radiation by a laser diode array;
emitting phosphor radiation by a phosphor illumination unit, following an exposure to the laser radiation;
conveying, by intermediate optics, the phosphor radiation to a multiple-angle illumination unit; and
dark field illuminating a region of the sample wafer from multiple angles with the phosphor radiation during a wafer inspection.

18. The method according to claim 17 further comprising:
emitting an addition laser radiation by an additional laser diode array; emitting additional phosphor radiation by an additional phosphor illumination unit, following an exposure to the laser radiation;
conveying, by an additional intermediate optics, the additional phosphor radiation to the multiple-angle illumination unit; and
illuminating the region of the sample wafer from multiple angles, with the additional phosphor radiation.

19. The method according to claim 17 further comprising:
emitting an addition laser radiation by an additional laser diode array; emitting additional phosphor radiation by an additional phosphor illumination unit, following an exposure to the laser radiation;
conveying, by an additional intermediate optics, the additional phosphor radiation to an additional multiple-angle illumination unit; and
illuminating the region of the sample wafer from multiple angles, with the additional phosphor radiation.

20. The method according to claim 17, wherein the wafer inspection comprises defect detection.

* * * * *